F. F. FORSHEE.
ARRANGEMENT OF HEATERS IN ELECTRIC OVENS.
APPLICATION FILED DEC. 13, 1919.
1,398,542.  Patented Nov. 29, 1921.
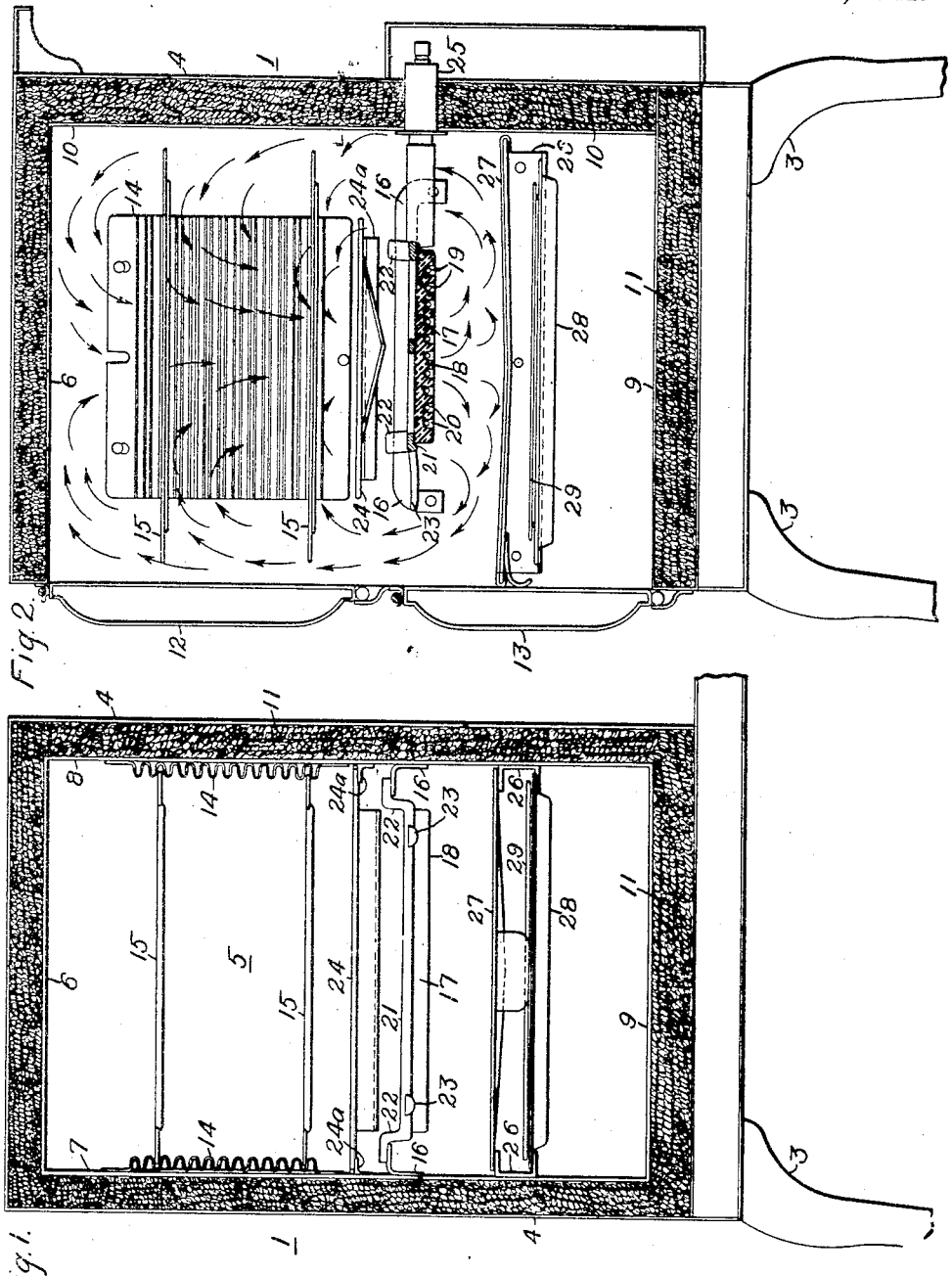
WITNESSES:
J. A. Helsel
H. M. Biebel
INVENTOR
Frank F. Forshee
BY
Chesley L. Carr
ATTORNEY

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

ARRANGEMENT OF HEATERS IN ELECTRIC OVENS.

1,398,542.  Specification of Letters Patent.  Patented Nov. 29, 1921.

Application filed December 13, 1919. Serial No. 344,511.

*To all whom it may concern:*

Be it known that I, FRANK F. FORSHEE, a citizen of the United States, and a resident of Flint, in the county of Genesee and State of Michigan, have invented a new and useful Improvement in the Arrangement of Heaters in Electric Ovens, of which the following is a specification.

My invention relates to electric ovens and particularly to methods of heating such ovens.

The object of my invention is to so arrange an electric heating element in an oven chamber that one element will heat the space above the heater by convection heat, thus resulting in a more uniform temperature in this space, and will simultaneously heat the space below the element by radiation.

Heretofore, it has been considered necessary to provide either one electric heating element located at or near the bottom of the oven or, if the oven was quite large, two heating elements were provided, one located at the bottom and one at the top of the oven.

In practising my invention, I provide an electric heating element comprising a plate of refractory material on one surface of which a resistor is suitably mounted. I so mount this heating element in a horizontal and substantially central plane in the oven chamber that the resistor will be on the under surface. I provide a removable plate at a small distance below the element to divide the oven chamber into two parts. I provide also a deflector located at a small distance above the heating element to more effectively prevent the radiation of any heat into the upper chamber.

In the single sheet of the accompanying drawing, Figure 1 is a transverse sectional view of an electric oven and Fig. 2 is a longitudinal sectional view thereof, with the parts therein arranged to accord with my invention.

An oven 1 is mounted on a supporting frame 2 which is, in turn, mounted on a plurality of supports 3. The oven 1 comprises an outer casing 4 and an inner oven chamber 5 having a top wall 6, side walls 7 and 8, a bottom wall 9 and a back wall 10. The chamber 5 is smaller in dimensions than the outer casing 4, thus providing space on five sides of the chamber 5 for suitable heat insulating material 11. The front of the chamber 5 is made flush with the outer casing 4 and an upper door 12 and a lower door 13 are provided to permit the introduction and the removal of food and food containers.

Corrugated racks 14 are suitably secured to the side walls 7 and 8 and support trays 15, which may be placed any desired distance apart to support a plurality of cooking utensils (not shown).

Supporting members 16 are suitably secured to the side walls, upon which rest a heating element 17 substantially rectangular in outline. The heating element 17 comprises a plate 18 of refractory material having an exposed resistor 19 laid in grooves 20 in one face thereof. The plate 18 is secured to a metal frame 21, which is provided with extensions 22 which engage the supporting members 16, and with handles 23. Stationary contact sockets 25 are provided in the rear of the oven, suitably insulated therefrom and the element 17 has projecting contact plugs which engage the sockets 25 and complete the circuit through the resistor. The heating element 17 is located in a substantially central horizontal plane and is so placed that the exposed resistor is on the under surface of the element instead of on the upper surface, as has usually been the case heretofore, for a purpose to be hereinafter described.

A deflector plate 24 is located above the heating element 17, the under surface thereof being of substantially V-shape to aid in properly distributing the heat. The plate 24 is supported by members 24ª which are suitably secured to the side walls 7 and 8.

Two supporting members 26 of substantially channel section, which are secured to the side walls 7 and 8 at a relatively small distance below the heating element 17, serve to support a metal plate 27, a pan 28, and a broiling rack 29. The metal plate 27 is of substantially the same area as the cross section of the oven and divides the chamber 5 into a large and a small part. The plate 27 acts also as a reflector and tends to project the heat upward.

If the location of the various parts is as shown in the drawing and, if the heating element be energized, only a small part of the heat is transmitted by radiation through the deflector plate 24, the larger part of the heat being radiated from the exposed resistor 19 into the space immediately below the heating element and above the plate 27. The heated air rising from the upper surface of the heating element 17 strikes the deflector plate 24 and is deflected against the walls of the oven thus aiding in the distribution of the heat. As the heating element 17 is smaller in area than the chamber 5, convection currents of heated air are set up, substantially as shown by the arrows in Fig. 2, with the result that the temperature in the chamber above the heating element is practically uniform throughout the chamber. It is, therefore, difficult to overheat and burn any food which may be placed in a cooking utensil on the lower of the two racks 15. If it is desired to broil a piece of meat, it is necessary only to remove the metal plate 27 and place it in the lower part of the racks 14 and then place the article to be broiled on the rack 29. When the heating element is energized, the larger part of the heat is transmitted to the article by radiation and the operation of broiling is completed in a relatively short time. If desired, cooking or broiling operations may be conducted simultaneously, in which case the metal plate 27 is removed altogether from the oven chamber, and the food to be cooked is placed below the element. A single heating element suffices for carrying on two cooking operations simultaneously, and may be included in either the upper or the lower part of the chamber by very simple means.

Various changes may be made without departing from the spirit and the scope of my invention and I desire that only such limitations shall be placed thereon as are imposed by the prior art or are specifically set forth in the appended claims.

I claim as my invention:

1. In an electric range, the combination with an oven having a chamber and means for dividing said oven into an upper and a lower compartment, of a single electric heating element mounted in the upper compartment, and means for causing said heating element to uniformly heat said upper compartment by convection.

2. In an electric range, the combination with an oven having a chamber, of a single electric heating element located substantially centrally in said chamber, means located above said heating element and adapted to cause said heating element to uniformly heat the upper part of said chamber, means for supporting a plurality of cooking utensils in the upper part of said chamber and means located below said heating element for decreasing the depth of the portion of said chamber which is heated by said element.

3. In an electric range, the combination with an oven having a chamber, of a single electric heating element in said chamber located substantially centrally therein and adapted to heat the space below said element by radiated heat, and means located above said element adapted to cause the space in said chamber above said element to be heated by convection and reflection.

4. In an electric range, the combination with an oven having a chamber, of a single electric heating element located substantially centrally in said chamber and adapted to raise the temperature of that part of the chamber above said element by convection and of that part of the chamber below said element, by radiation.

5. In an electric range, the combination with an oven having a chamber, of a single electric heating element located in a horizontal and substantially central plane in said chamber, means located above said element adapted to cause the heat from said element to be uniformly distributed in the upper part of said chamber, and means located below said element for dividing said chamber into two parts and for reducing the amount of heat carried by convection to the lower part of said chamber.

6. In an electric range, the combination with an oven having a chamber, of a single heating element located substantially centrally in said chamber, means located above said element adapted to cause the heat from said element to be uniformly distributed in the upper part of said chamber, and means located below said heating element for decreasing the depth of, and reflecting the heat into, the portion of said chamber which is heated by said element.

In testimony whereof I have hereunto subscribed my name this second day of December, 1919.

FRANK F. FORSHEE